Sept. 11, 1951 G. J. ZEIS ET AL 2,567,501
VISOR FOR AUTOMOBILES
Filed May 27, 1948 4 Sheets-Sheet 3
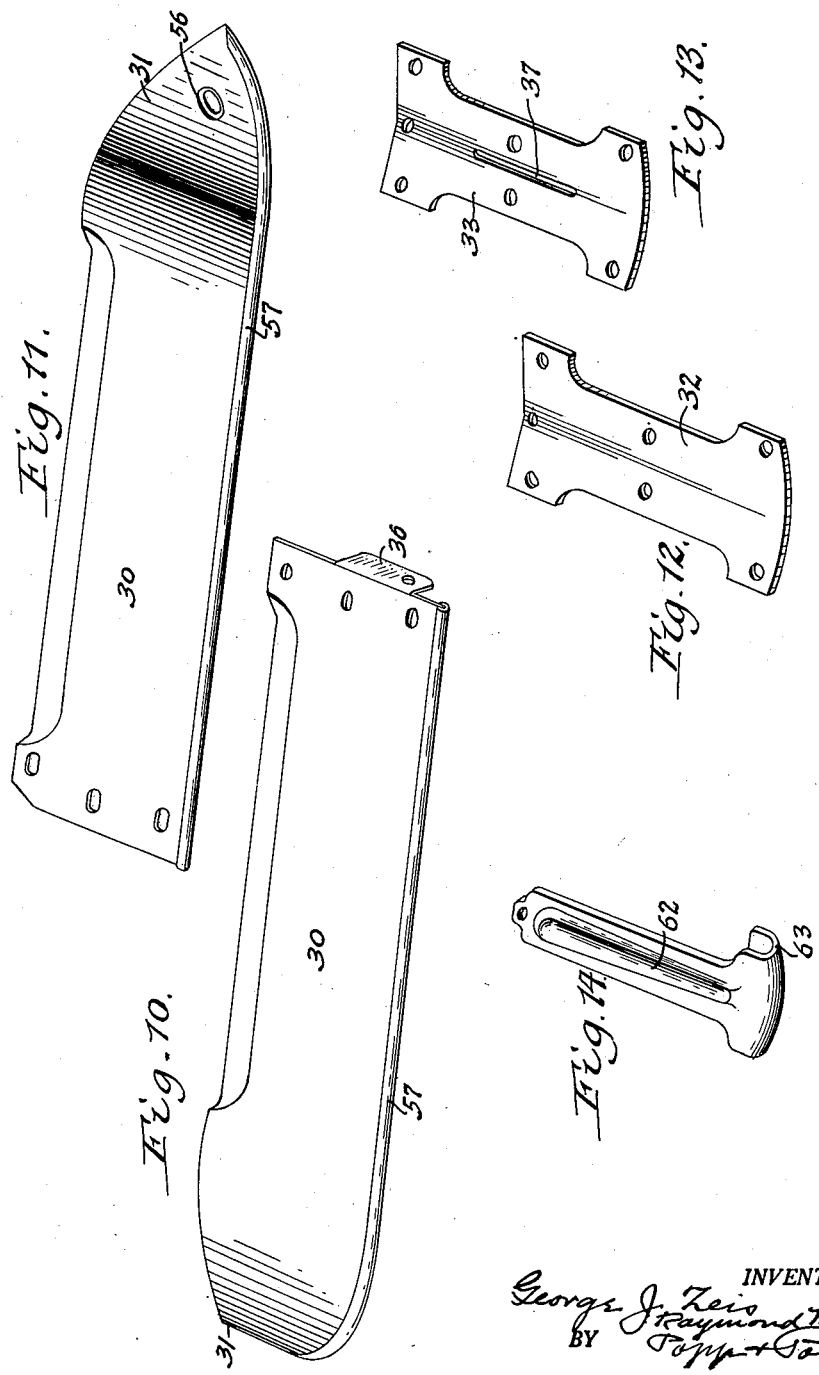

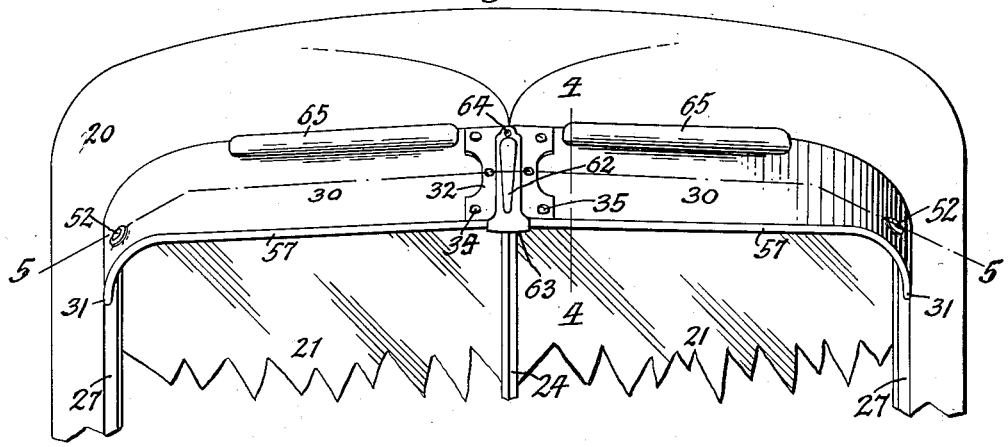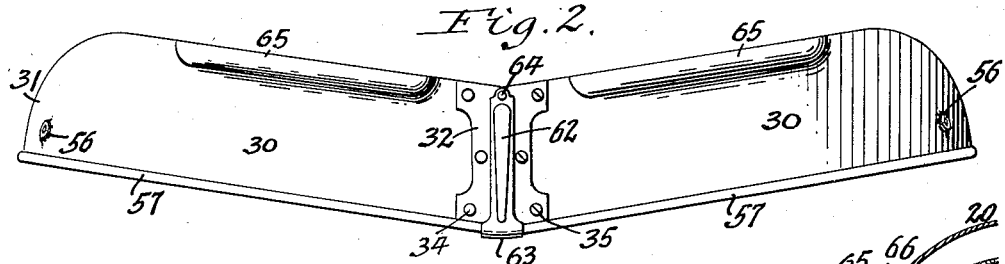

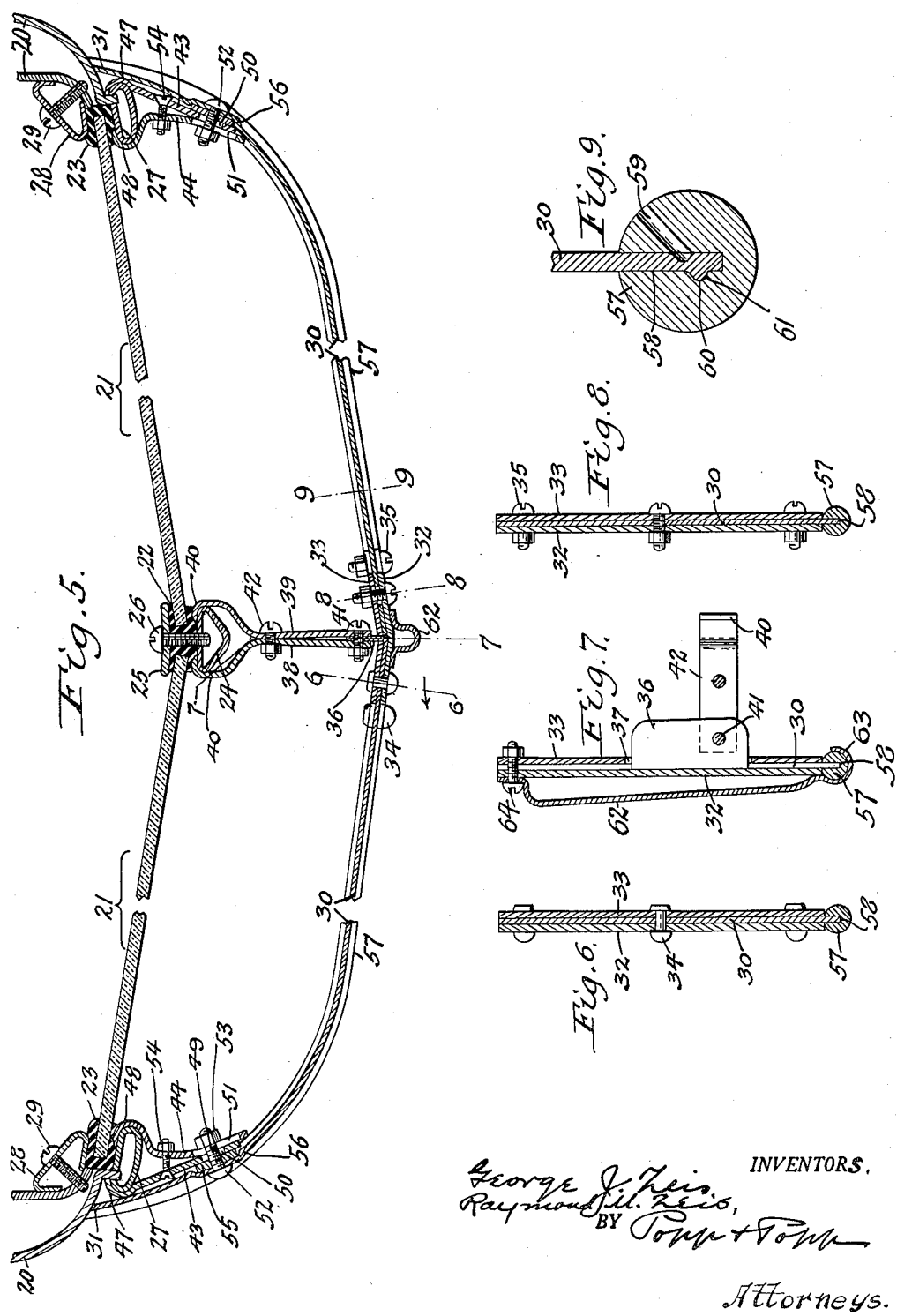

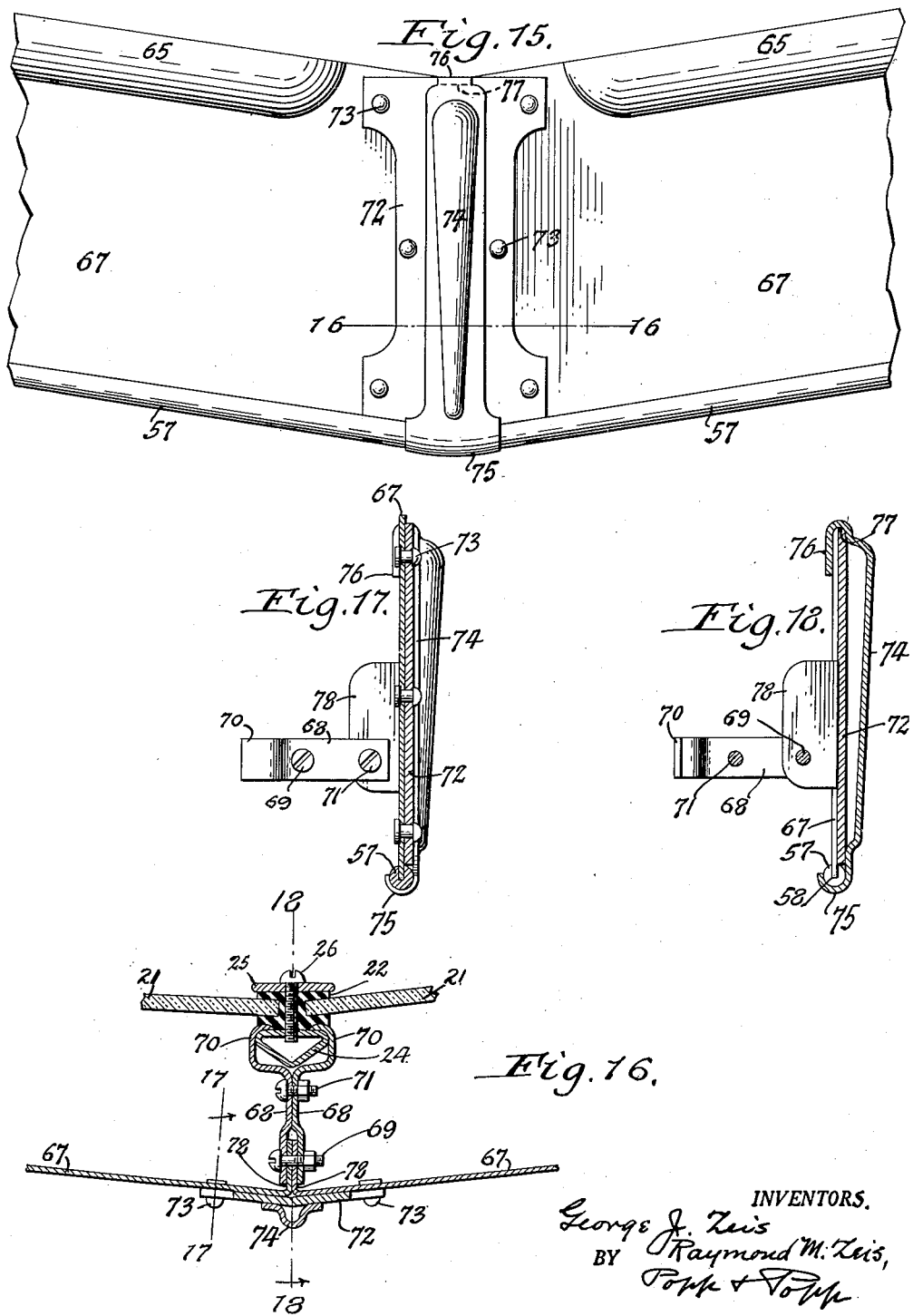

Patented Sept. 11, 1951

2,567,501

UNITED STATES PATENT OFFICE 2,567,501

VISOR FOR AUTOMOBILES

George J. Zeis and Raymond M. Zeis, Buffalo, N. Y.

Application May 27, 1948, Serial No. 29,624

4 Claims. (Cl. 296—95)

This invention relates to a visor which is more particularly intended for use on automobiles so as to overhang the upper part of the windshield and protect the eyes of the driver from the effects of intense sunlight and the effects of weather conditions.

It is the object of this invention to provide a visor for this purpose which can be readily attached to the bodies of automobiles of standard construction without requiring any alteration on the same.

Another object of this invention is to provide a visor for use on automobiles which is attractive in appearance and has no parts which project to an objectionable extent but instead maintain a streamlined appearance of the body and avoid any interference with the speed of the car.

A further object of this invention is to provide a visor for this purpose which can be readily mounted on the automobile so as to produce a tight or close fit and prevent any vibration of the visor when the same is in use and also to so organize the several parts that the same are strong and durable also permit a free passage underneath the same so as to carry away any rain, dust or insects which may be encountered and thereby maintain the windshield clear of obstructions and insure a clear vision for the driver and the occupants of the car.

In the accompanying drawings:

Fig. 1 is a fragmentary front elevation of the upper part of the windshield and body of an automobile showing a visor mounted thereon which embodies this invention.

Fig. 2 is a fragmentary plan view of the visor, on a somewhat enlarged scale, detached from the automobile.

Fig. 3 is a fragmentary side elevation, on a still larger scale, of the front part of the windshield and body of an automobile equipped with a visor of the present invention.

Fig. 4 is a fragmentary vertical longitudinal section, on the same scale as Fig. 3, taken on line 4—4, Fig. 1.

Fig. 5 is a fragmentary horizontal section, on an enlarged scale, taken on line 5—5, Fig. 1.

Figs. 6, 7, 8 and 9 are vertical sections, on an enlarged scale, taken on the correspondingly number lines in Fig. 5.

Figs. 10 and 11 are perspective views of the two sections of the body or sunshield plates of the visor made in accordance with the construction shown in Figs. 1 to 8.

Figs. 12 and 13 are perspective views of the front and rear coupling plates forming part of the means whereby the opposing inner ends of the two plate sections of the sunshield or body are connected with each other.

Fig. 14 is a similar view of the cover which is attached to the central part of the visor to conceal the joint between the opposing inner ends of the visor sections.

Fig. 15 is a fragmentary plan view of a visor embodying a modified form of this invention.

Fig. 16 is a horizontal section taken on line 16—16, Fig. 15.

Figs. 17 and 18 are vertical sections taken on lines 17—17 and 18—18 respectively in Fig. 16.

In the following description similar characters of reference indicate like parts in the several figures of the drawings.

The windshield and automobile body, which are adapted to receive the visor of this invention, may be variously constructed, but the form shown in Figs. 1, 3 and 4, as an example of one suitable for receiving this invention, is constructed as follows:

The numeral 20 represents the body or wall of the automobile and the numerals 21, 21 represent two transparent panes of glass or other suitable material forming part of the windshield extending across the front part of the automobile body. These two panes have their opposing inner ends fitted in grooves formed on opposite sides of an upright cushion 22 of rubber which is H-shaped in cross section while the outer edge of each of these panes is fitted in the channel or groove of a cushion 23 of rubber which is U-shaped in cross section. The central rubber cushion is mounted on the body of the automobile between a front upright center molding 24 thereon and a rear fastening bar 25 which is connected with the molding 24 by means of screws one of which is shown at 26 in Fig. 5.

Each of the U-shaped side cushions 23 is mounted on the adjacent part of the body of the automobile by engagement of its front side with an upright side molding 27 secured to the automobile body and a fastening bar 28 engaging the rear side of this cushion and connected by means of one or more screws 29 with the adjacent part of the car body.

In general the visor which is made in accordance with this invention comprises a sunshield having two plate sections which are arranged side by side across the upper part of the windshield of the car, coupling means for connecting the opposing inner ends of these sections, and means for mounting the central and end parts of these visor sections on the central and side parts of the car body across the windshield.

Each of the sunshield plate sections is made of sheet metal so as to provide a relatively straight inner body 30 which extends across one-half of the windshield on one side of the center of the same, but is spaced therefrom, and a curved outer end or wing 31 which extends rearwardly from the body 30, each of these sunshield sections being so constructed that when the same are mounted on the automobile the upper or rear edge of the visor sections engage with the adjacent part of the car body around the upper part of the windshield, while the lower edge of these sections are spaced from the adjacent part of the windshield, as shown in Figs. 3 and 4.

Means are provided for connecting the opposing inner ends of the sunshield sections of the visor with each other and also mounting the same on the central upright molding 24 of the windshield, which means in the form shown in Figs. 1, 2, 4, 5, 6, 7, 8, 10, 11, 12 and 13 are constructed as follows:

The opposing inner ends of the two visor body plate sections are connected with each other by means of front and rear coupling plates 32, 33 which engage respectively with the front and rear sides of the adjacent parts of the visor body plates. These two coupling plates are preferably connected with these visor body plates in such a manner that they can be readily assembled in compact form for convenience in shipping and also readily assembled in their proper operative position on an automobile.

For this purpose one of the visor body plates 30 and those parts of the coupling plates 32, 33 which engage the front and rear sides thereof are permanently connected by means of rivets 34, as shown in Figs. 1, 2 and 6, and the other visor body plate 30 is connected with the corresponding parts of these coupling plates by means of bolts 35, as shown in Figs. 5 and 8.

At its inner end, the body 30 of the righthand sunshield plate section, is provided with a coupling lug 36 which projects rearwardly toward the center molding 24, but the opposing inner end of the body 30 of the other sunshield section is not provided with such a lug, as best shown in Figs. 5 and 11.

For the purpose of permitting the coupling lug 36 to project rearwardly from the respective visor plate 30 the rear coupling plate 33 is provided with a vertical slot 37 through which the lug 36 projects in the assembled position of the visor members.

In rear of the joint between the sunshield plate members of the visor is arranged a stay which connects the central part of the visor with the central molding 24, which stay comprises two longitudinal coupling bars 38, 39 arranged side by side and each having its front part construction in the form of an arm while its rear part is constructed in the form of a hook shaped clamping jaw 40. The two arms of the coupling bars receive between them the rearwardly projecting coupling lug 36 and are secured thereto by means of a bolt 41 while the jaws of these two bars oppose each other and are secured in engagement with opposite sides of the central molding 24 by means of a bolt 42 passing through these coupling bars immediately in front of this molding, thereby securely holding the central part of the visor on the central part of the windshield.

Each of the rearwardly projecting end wings of the visor body plates is mounted on the upright side molding 27 of the windshield by means which are preferably constructed as follows:

The numerals 43, 44 represent outer and inner clamping bars which are arranged adjacent to the inner side of the respective wing of the visor, which bars are provided respectively at their front ends with corresponding longitudinal slots 50, 51 and at their rear ends with opposing hook shaped jaws 47, 48. The front parts of these clamping bars are connected with each other and the adjacent part of the respective visor end wing by means of a bolt the body 49 of which passes through the slots 50, 51 and the adjacent part of the visor wing and bears with its head 52 against the outer side of this wing, while the nut 53 of this bolt bears against the inner clamping bar 44. The two jaws at the inner ends of the clamping bars 43, 44 are held in engagement with the opposite sides of the adjacent side molding 27 by means of a bolt 54 which connects these bars immediately in rear of this molding, as best shown in Fig. 5.

For the purpose of strengthening that part of each visor wing through which the respective bolt passes a reinforcing washer 55 is arranged between the inner side of this wing and the outer side of the respective clamping bar 43 so that the body of this bolt also passes through the opening in this washer, as shown in Fig. 5. In order to hold these washers reliably in a definite position on the wings of the visor, each of these wings is provided with a socket or seat 56 on its inner side which receives the said washer, as shown in Fig. 5, these seats being preferably formed by displacing a part of the metal of the respective wing outwardly, as shown in the last mentioned figure.

When mounting the visor on the body of an automobile above the windshield thereof, the clamping bars 43, 44 are first secured to the moldings 27 and then the rear edges of the visor plates are placed against the outer side of the automobile body and the front bolt bodies 49, 49 are slid rearwardly in the slots 50, 51 the requisite extent and thereafter tightened.

For the purpose of avoiding the presentation of relatively sharp corners at the lower edges of the visor body plates each of these edges is provided with a molding 57 which is rounded in cross section and extends the full length of the respective visor body plate. Although various means may be employed for connecting this molding 57 with the respective body plate this is preferably accomplished as follows:

On its upper side each of the moldings 57 is provided with a longitudinal groove or channel 58 extending the full length thereof which groove receives the lower edge of one of the visor body plates. On the rear part of the molding 57 the same is provided with a plurality of openings 59 extending from the outer surface of the respective molding to the rear wall of the groove 58 and in the front part of this molding the same is provided with a plurality of recesses 60 each of which is opposite one of the openings 59 and extends forwardly from the front wall of the groove 58 but terminates short of the front side of this molding so that the same will not be seen. After the lower edge of the visor plate has been inserted in the groove 58 of the molding a punch is inserted into each of the openings 59 and driven forwardly against the adjacent part of the visor body plate with sufficient force to displace a part of this visor plate forwardly and produce a locking projection 61 on the front side thereof, which projection enters the recess 60 on the molding as shown in Fig. 9. By these means the molding is firmly interlocked with the respective visor body plate without the use of extra parts, thereby not only providing a finished appearance, but also avoiding the use of separate parts which might become loose and produce a noise while the visor and car are in use.

For the purpose of concealing the joint between the opposing inner ends of the visor moldings and rendering this part of the same attractive and ornamental in appearance, covering means are provided which, in the preferred form, comprise an upright covering bar 62 which overlaps the front coupling plate 32 and the opposing inner ends of the visor body plates and extends across the joint between the inner ends of the moldings 57. This covering bar is preferably held in place by providing its lower end with a hook 63 which passes rearwardly therefrom around the underside of the adjacent opposing parts of the moldings 57 of the two visor body plates, as shown in Figs. 1, 2 and 7 and a bolt 64 which passes through the upper end of this cover bar and the adjacent upper parts of the front and rear coupling plates 32, 33 and past the upper inner corners of the visor body plates.

For the purpose of causing the air underneath the visor to flow from the front edge to the rear edge thereof and thereby carry away any dust, insects and the like which otherwise would be liable to collect on the windshield and obstruct the vision of the driver, each of the body plates 30 of the visor is provided at its upper edge with a louver 65 which is formed by bending a longitudinal part of the upper edge portion of the respective visor body plate forwardly a sufficient distance to form a passage 66 between the underside of this louver and the adjacent part of the car body. The upper edge of each of these louvers terminates flush with the adjacent upper edge portions of this plate, thereby not only rendering this part of the visor attractive in appearance, but also avoiding any projecting part above the visor which otherwise would be liable to produce a noise due to the pressure of the wind against the same while the automobile is in operation.

In the modified form of this invention, shown in Figs. 15-18 the means for connecting the opposing inner ends of the two visor body plates and mounting the same on the windshield are constructed as follows:

The numeral 78 represents two coupling lugs which are arranged, respectively, on the inner opposing ends of the two visor body plates 67, 67 and project rearwardly therefrom and engage with each other. These two lugs are received between the front ends of two clamping bars 68, 68 and are connected therewith by means of a bolt 69 passing through these members, as shown in Fig. 16. The clamping or coupling hooks 70, 70 on the rear ends of these bars are held in engagement with opposite sides of the central molding 24 of the windshield by means of a bolt 71 in the same manner in which this is done in the construction shown in Fig. 5.

The numeral 72 represents a single coupling plate which is permanently secured to the opposing end portions of the visor body plates 67, 67 by means of rivets 73. The joint between the opposing ends of the respective lower moldings 57, 57 is concealed by means of a cover bar 74 which is arranged centrally on the front side of the coupling plate 72 and is provided at its lower end with a hook 75 extending rearwardly and upwardly around the underside of the joint between the moldings 57, 57. This cover is preferably secured in place without the use of any bolts, rivets or similar means, but by a bendable tongue 76 formed integrally with the cover bar 74 at the upper end thereof and bent downwardly over the upper edges of the coupling plate 72 and the visor body plates thereby holding these parts together.

For the purpose of producing a finished appearance on the upper central part of the visor the adjacent inner opposing corners of the visor body plates are cut so as to form a notch 77 which receives the tongue 76, as shown in Fig. 15, which construction also holds the cover bar 74 against transverse displacement on the visor wall plates.

When both visor body plates 67, 67 are riveted to the coupling plate 72, as shown in Figs. 15 and 16, the same forms a relatively long structure which requires an unduly long container for shipping purposes; but if it is desired to render this visor more compact for greater convenience in shipping, one of the visor body plates 67 may be connected with the coupling plate 72 by means of bolts similar to the manner in which this is accomplished in the construction shown in Fig. 5.

As a whole this visor not only serves as a protection against the effects of strong sunlight and materially adds to the attractive appearance of the car and, due to the manner in which the same is mounted, no parts of the same are liable to become loose while in operation and thus avoid the production of noise.

Moreover this visor is so constructed that the same can be folded into a compact bundle which can be readily shipped at low cost and also conveniently assembled and mounted on a car without requiring special skill or tools for this purpose.

We claim:

1. A visor for an automobile having a window, and a molding adjacent to said window; comprising a shield plate adapted to overhang said window, and means for mounting said plate on said molding including two clamping bars provided at one of their corresponding ends with longitudinal slots and at their opposite end with opposing jaws, a front fastening bolt passing through said slots and connecting said bars with said plate, a rear fastening bolt connecting said bars and adapted to hold said jaws in engagement with opposite sides of said molding and a reinforcing washer through which said front bolt passes and which is arranged in a recess on the inner side of said plate opposite one of said clamping bars.

2. A visor for an automobile having a body, a window, and a support on said body adjacent to the window; comprising a shield plate adapted to overhang said window and including a plurality of plate sections having opposing inner ends which are provided with rearwardly projecting attaching lugs, and means for mounting said shield plate sections on said body including a stay including bars the front ends of which receive between them said lugs and are secured thereto and the rear ends of which are provided with opposing jaws which engage with opposite sides of said support and are secured thereto.

3. A visor for an automobile having a body and a window in said body; comprising a shield plate adapted to overhang said window, and a molding provided with a longitudinal groove which receives the edge of said plate and also provided with an opening on one side of said groove and a recess on the opposite side of said groove, and the metal of said plate opposite said opening being displaced into said recess of the molding and forming an interlocking connection between said plate and molding.

4. A visor for automobiles comprising an inclined shield plate which is adapted to be mounted on an automobile body and to engage parts of its upper edge with the body of the automobile and other parts of said edge being provided with a forwardly deflected louver between which and the automobile body a passage is formed for the flow of air and said louver having its upper edge arranged flush with the adjacent upper edge portions of said shield plate.

GEORGE J. ZEIS.
RAYMOND M. ZEIS.

REFERENCES CITED

The following references are of record in the file of this patent:

UNITED STATES PATENTS

| Number | Name | Date |
| --- | --- | --- |
| 1,167,221 | Rice | Jan. 4, 1916 |
| 1,800,359 | Sandstrom | Apr. 14, 1931 |
| 2,051,722 | Koch | Aug. 18, 1936 |
| 2,264,014 | Wohlfield | Nov. 25, 1941 |
| 2,334,856 | Atkinson | Nov. 23, 1943 |
| 2,500,406 | Greenfield | Mar. 14, 1950 |
| 2,506,108 | Riemann et al. | May 2, 1950 |